W. ELLIOTT & R. H. SCHLACHTER.
DRAFT EQUALIZER.
APPLICATION FILED JUNE 21, 1909.
947,893. Patented Feb. 1, 1910.
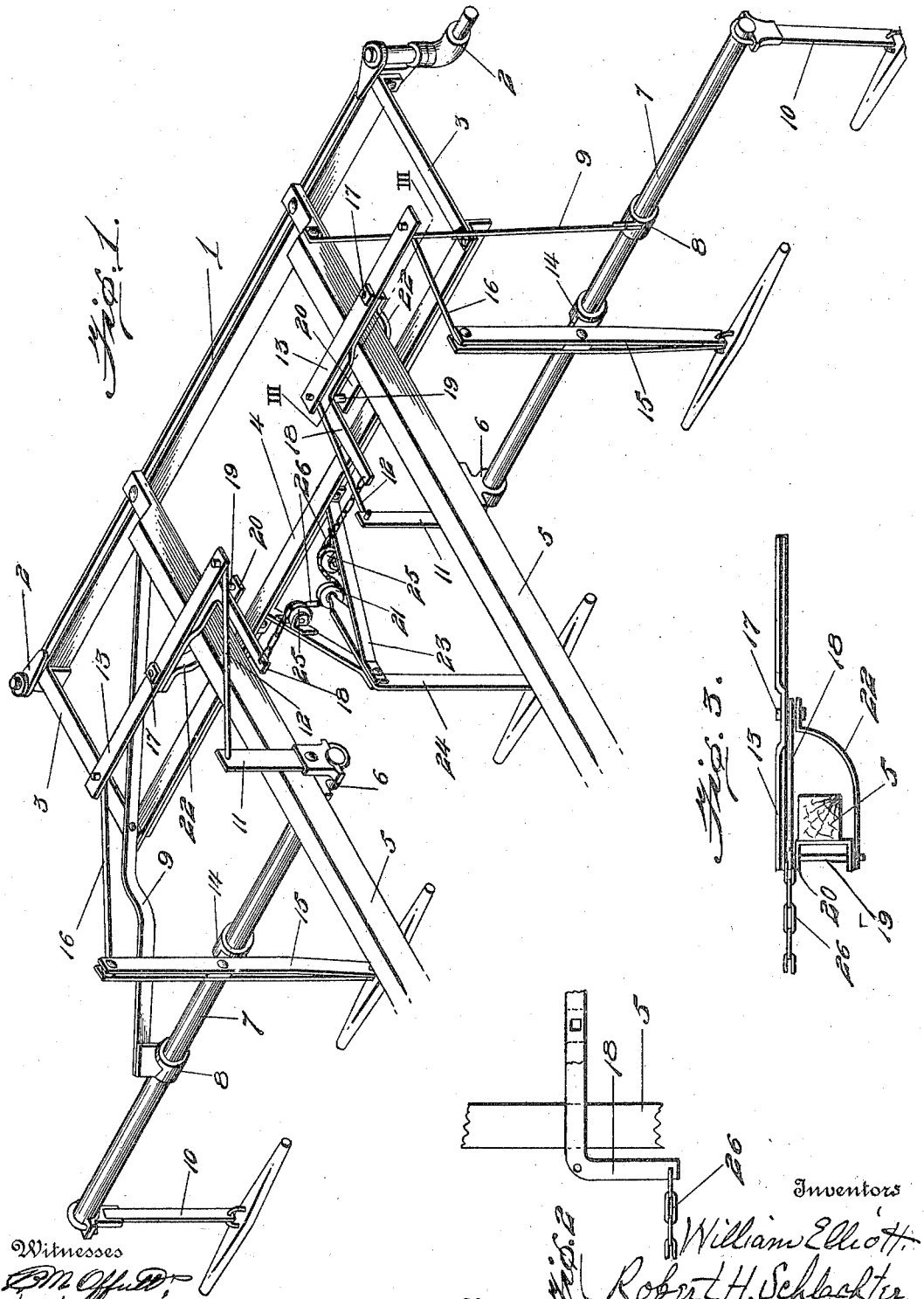
Witnesses
Inventors
William Elliott
Robert H. Schlachter
By Frank A. Spencer, Attorney.

UNITED STATES PATENT OFFICE.

WILLIAM ELLIOTT AND ROBERT H. SCHLACHTER, OF BEATRICE, NEBRASKA, ASSIGNORS TO DEMPSTER MILL MANUFACTURING COMPANY, OF BEATRICE, NEBRASKA.

DRAFT-EQUALIZER.

947,893.  Specification of Letters Patent.  Patented Feb. 1, 1910.

Application filed June 21, 1909. Serial No. 503,506.

*To all whom it may concern:*

Be it known that we, WILLIAM ELLIOTT and ROBERT H. SCHLACHTER, citizens of the United States, residing at Beatrice, in the county of Gage and State of Nebraska, have invented certain new and useful Improvements in Draft-Equalizers, of which the following is a specification.

Our invention relates to draft-equalizers for wheel cultivators, or other wheeled agricultural implements or vehicles, and especially to devices for equalizing the draft of four horses, two on each side of the machine, or of five horses, the fifth animal being placed between the tongues, in the center of the machine.

Another object of our construction is to overcome the downward strain, or neck-weight, usually produced on the necks of the horses by the pressure on the tongues due to the fact that the forward ends of the plow-beams are usually attached, in implements of this class, either directly or indirectly, to the tongues in front of the axle of the cultivator. We counteract this "neckweight" by providing for the application of the traction power at points in the machine as low down as is compatible with its proper operation.

Another peculiarity of our construction consists in the use of rotatable draw-bars mounted to rotate in bearings attached to the frame, to which bars the traction power is applied in such a manner that the equalization is effected by the rotation of the bars.

In the accompanying drawings Figure 1 is a perspective view of our devices applied to a cultivator, the parts of the machine not immediately involved in our invention being omitted. Fig. 2 is a plan view of a bell-crank lever and its connections forming part of our device. Fig. 3 is a side elevation of the same, partly in section, on the line III—III of Fig. 1.

1 indicates the main sill or axle of the machine, to the ends of which are pivoted the crank axles 2.

3 and 4 are members of the main frame.

5 indicates the poles or tongues projecting forward from the frame, rigidly secured thereto, and practically forming a part thereof. To the tongues 5 are secured sleeves 6, which form bearings for one end of rotatable draw-bars 7. The other bearings for said draw-bars are the loose sleeves 8 rigidly secured on the rods 9 extending from the tongue 5 and supported by the frame. The outer ends of the bars 7 carry rigidly attached, downwardly projecting draft-bars 10, provided with swingletrees at their lower ends. The inner ends of bars 7, inside the tongues 5, carry upwardly projecting and rigidly attached radial arms 11, said arms being pivotally connected by rods 12 with equalizer-bars 13. On draw-bars 7, between the bearings 6 and 8, are mounted loose sleeve brackets 14, to which are rigidly secured vertical draft-levers 15, having a rocking movement on bars 7, to the lower ends of which levers swingletrees are attached. The upper ends of said levers 15 are pivotally connected, by rods 16, with equalizer-bars 13.

The equalizer-bars 13 are pivoted about centrally, by bolts 17, (see Figs. 2 and 3) to the outer ends of horizontally pivoted bell-crank levers 18. Said bell-cranks are pivoted, at their angles, on bolts 19 set in brackets 20 secured on the tongues 5; and a chain or rod 21 extends from each of the forwardly extending arms of bell-cranks 18 to the corresponding arm on the opposite side of the machine. Curved braces 22 are pivoted on the lower ends of bolts 19 and extend upwardly to the bolts 17, thus forming a swinging support for the pivotal connection of equalizer-bars 13 with bell-cranks 18.

In operation it will be seen that when traction is applied to the draft-bars 10 the draw-bars 7 will be rotated rearwardly, carrying with them the radial arms 11, which will push against connecting-rods 12, and tend to rotate equalizer-bars 13 on their pivots 17. Traction being also applied to the lower ends of draft-levers 15, said levers will rock on bars 7, push against rods 16, and tend to rotate equalizer-bars 13 in a direction contrary to the force coming from draft-bars 10. Equalizer-bars 13 being pivoted at 17 to arms of crank-levers 18, the result of the opposing forces will be that said arms will be rotated backward to the limit of their movement, and the machine will be drawn forward; the power attached to the members 10 and 15 being thus equalized on each side of the implement.

When the implement is used as a four-horse equalizer the chain 21 will preferably connect directly the forward arm of bell-crank 18 on one side of the machine with the corresponding arm on the other side; or a rigid rod may be substituted for the chain; or other suitable means may be provided for fixing the proper limit to the rotation of the bell-cranks on their pivots 19; thus balancing the power of the two horses on one side of the implement against that of those on the opposite side.

When the machine is used as a five-horse equalizer the fifth horse travels between the tongues. A suitable bracket 23 is provided, secured on the frame midway between the tongues, and on said bracket is pivotally mounted a bell-crank 24, the same having a pendent arm to which a swingletree is attached, and a substantially horizontal arm extending rearwardly and carrying at its inner end a rotatable sheave or roller 25, which bears against the chain 21. Said chain passes over supporting rollers 26 mounted on bracket 23, and connects with the forward arms of bell-cranks 18, before described. It is obvious that traction applied to crank 24 will draw on cranks 18, and tend to rotate them against the force coming from the equalizer-bars 13. The pendent arm of bell-crank 24 is made considerably longer than the horizontal arm, to compensate for the fact that the center horse will work against the power exerted by the four other horses.

Other flexible means for connecting the bell-cranks on opposite sides of the implement may be substituted for the chain 21; the proper modifications being made in the means for applying the power of the fifth horse to such flexible connection.

The respective proportions of all the parts described will be such as to secure the proper action and result.

Various changes may be made in the details of our device, especially in the position, arrangement, and adjustment of the parts without departing from the essential principle and spirit of our invention; and we therefore do not limit our claims to the precise details described.

Having described our invention, we claim as new and desire to secure by Letters Patent:

1. In a wheeled cultivator or other wheeled agricultural implement, or vehicle, in combination with a main frame, a rotatable draw-bar mounted in bearings carried by the frame, a pendent radial draft-bar and an extending radial arm, both rigidly secured on said bar, a draft-lever mounted to rock on said draw-bar, an equalizer-bar pivotally mounted rearwardly from said draw-bar, and connecting-rods between the ends of said equalizer-bar and said radial arm and draft-lever.

2. In an implement of the class described, in combination with the frame, an equalizing device comprising rotatable draw-bars on each side of the implement, suitable bearings for said draw-bars, pendent radial draft-bars and extending radial arms, both secured on said draw-bars, draft-levers mounted to rock on said draw-bars, equalizing-levers mounted horizontally in rear of said draw-bars, connections between the ends of said equalizing-levers and said radial arms and draft-levers, bell-cranks pivoted on the frame and forming the pivotal support for said equalizing-levers, and means extending across the center of the implement for connecting said bell-cranks.

3. In a draft-equalizer, the combination of the supporting frame, rotatable draw-bars mounted in line thereon, radial draft-bars and radial arms extending from said draw-bars, draft-levers mounted to rock on said draw-bars, bell-cranks pivoted horizontally on the frame, equalizing-levers pivoted on said bell-cranks, connections between said equalizing-levers and said draft-levers and radial arms, a flexible connection across the machine between said bell-cranks, a bracket secured to the frame, a bell-crank pivoted on said bracket, said crank having a pendent arm for the attachment of draft, and an inwardly extending arm carrying a roller bearing on said flexible connection.

4. In an implement of the class described, in combination with the frame, an equalizing device comprising rotatable draw-bars on each side of the implement, pendent radial draft-bars and extending radial arms, both secured on said draw-bars, draft-levers mounted to rock on said draw-bars, equalizing-levers mounted in rear of said draw-bars, connections between the ends of said equalizing-levers and said radial arms and draft-levers, and means for flexibly connecting the equalizing-levers on opposite sides of the implement.

5. In a draft-equalizer, the combination of the frame, rotatable draw-bars mounted thereon, on each side of the implement, radial draft-bars and radial arms extending from said draw-bars, draft-levers mounted to rock on said draw-bars, bell-cranks pivoted on the frame, equalizer-bars pivoted on said bell-cranks, connections between said equalizer-bars and said draft-levers and radial arms, a flexible connection across the implement between said bell-cranks, and means provided in the central portion of the implement for applying draft to said flexible connection, for the purposes set forth.

In testimony whereof we affix our signatures in presence of two witnesses.

WILLIAM ELLIOTT.
ROBERT H. SCHLACHTER.

Witnesses:
F. D. STONE,
D. W. CARRE.